(12) United States Patent
Ang

(10) Patent No.: US 11,084,948 B2
(45) Date of Patent: Aug. 10, 2021

(54) BLACK INK COMPOSITION

(71) Applicant: GA CHEMICAL PTE LTD, Singapore (SG)

(72) Inventor: Chin Chian Ang, Singapore (SG)

(73) Assignee: GA CHEMICAL PTE LTD, Singapore (SG)

( * ) Notice: Subject to any disclaimer, the term of this patent is extended or adjusted under 35 U.S.C. 154(b) by 0 days.

(21) Appl. No.: 16/182,533

(22) Filed: Nov. 6, 2018

(65) Prior Publication Data

US 2019/0071577 A1    Mar. 7, 2019

Related U.S. Application Data

(63) Continuation-in-part of application No. 14/894,371, filed on Nov. 27, 2015, now abandoned.

(51) Int. Cl.
| | |
|---|---|
| *C09D 11/03* | (2014.01) |
| *C09D 11/10* | (2014.01) |
| *C09D 11/037* | (2014.01) |
| *C09D 11/107* | (2014.01) |

(52) U.S. Cl.
CPC .......... *C09D 11/037* (2013.01); *C09D 11/107* (2013.01)

(58) Field of Classification Search
CPC ............................ C09D 11/037; C09D 11/107
USPC ......................................................... 524/543
See application file for complete search history.

(56) References Cited

U.S. PATENT DOCUMENTS

| | | | | |
|---|---|---|---|---|
| 4,327,011 A | * | 4/1982 | Ripley | C08K 5/01 524/474 |
| 5,919,838 A | * | 7/1999 | Mizobuchi | C09D 11/02 523/161 |
| 8,138,250 B2 | * | 3/2012 | Hassan | D21H 17/60 524/310 |

FOREIGN PATENT DOCUMENTS

| | | | |
|---|---|---|---|
| CN | 102134428 A | * | 7/2011 |
| JP | 2001098203 A | * | 4/2001 |

* cited by examiner

*Primary Examiner* — Michael Bernshteyn
(74) *Attorney, Agent, or Firm* — WPAT, PC

(57) ABSTRACT

A black ink composition for post print and preprint, obtainable by adding (colour concentrate mixture) solid red concentrate, blue concentrate, and green concentrate to a carbon black ink having a concentration of 10-25% by weight of the composition, wherein the carbon black has not undergone oxidation treatment, and the colour pigments are made up 75-90% by weight.

7 Claims, No Drawings

BLACK INK COMPOSITION

CROSS-REFERENCE TO RELATED APPLICATION

This is a continuation-in-part application of the co-pending patent application Ser. No. 14/894,371.

BACKGROUND OF THE INVENTION

1. Field of the Invention

The present invention relates to a black ink composition for hot stamping and a method of preparing a black ink composition with favorable dispersibility, and also relate to water-based flexographic printing ink with ink containing the black ink composition.

2. Description of the Related Art

A water-based ink is an ink that has either the pigments or the dyes in a colloidal suspension in a solvent, with the solvent being water. All though the main solvent in water based inks is water; there can also be other cosolvents present. These cosolvents typically are volatile organic compounds VOC's.

Water based inks have been in existence since around 2500 B.C. The first water based inks were black writing inks that were typically carbon in water suspensions that were stabilized by either egg albumen or a natural gum. Even though water based inks have existed for over 4500 years; they were used very little up until the late 1960's. Water based inks have inherent problems, and thus ignored as a viable option to other solvent based inks for some time In the 1970's a crude oil shortage, combined with a new awareness of the damaging effects that the solvents in ink could have both on humans and the environment, new laws were put into effect forcing the ink industry to seek an alternative in the form of waste based inks. The goal of using water-based inks is to completely remove hazardous chemical from ink, not just reduce the VOC's volatile organic compounds that are present.

As with all inks, water based inks are formulated for their specific application and for specific properties or characteristics. That is the type of printing process they are to be used in, the substrate or surface they are to be printed on, the environment that the ink will be exposed to, the texture of the ink, the color of the ink, etc. The main properties of interest with water-based inks are their viscosities, surface tensions, stability of the colloidal dispersion, size and shape of the colorant particles, shear stability, bleeding, foamability, scrubbing resistance, water resistance, boiling point, temperature, and the pH.

The rheology of a system can be broken down into four categories, Newtonian, non Newtonian (pseudoplastic), dilatant, and thixotropic. Newtonian flow is where viscosity will remain more or less constant as shear force is applied. Non Newtonian flow or pseudoplastic flow is when viscosity will decrease as there is an increase in shear. Dilatant flow is when both the viscosity and shear increases together. Thixotropic flow is where the where viscosity will decrease as there is an increase in shear, which is similar to pseudoplastic flow with exception of thixotropic flow having a time dependent characteristic. Most water-based inks will fall into the category of thixotropic flow behavior. That is the ink will have a decreased viscosity when a shear force is applied, and when the shear force is removed the viscosity will return to its previous viscosity. In order to adjust the viscosity to the desired value a polymeric thickening agent can be used to increase the viscosity. Surface tension of an ink affects properties such as the foaming of an ink, and an inks wettability. The wettability of an ink is the inks ability to coat a substrate or surface. Generally speaking the higher the surface tension of the substrate the easier it will be to coat. Similarly, the lower the surface tension of the liquid that will be coating the substrate, the better it will wet. The best situation for the coating of a substrate occurs when the surface tension of the substrate is much greater then that of the liquid that will be coating the substrate. This is a problem for water based inks, as water has a very high surface tension of 72 mN/m, where are most other solvent based inks have a surface tension between 20-35 mN/m, so the surface tension of the water based ink will be higher then that of most substrates that it will be used to coat. To solve this problem typically a surfactant will be added, or the surface of the substrate will be modified through cleaning or another process. Surfactants are so called "surface active" molecules that contain both a hydrophilic and a hydrophobic portion. The addition of a surfactant to a water based ink will have the result of drastically lowering the surface tension of the ink due to the orientation effects at interfaces caused by the hydrophilic and hydrophobic portions of the surfactant.

The addition of the surfactant has the effect of lowering the surface tension, but it also accelerates the formation of foams in the ink. To prevent this it is necessary to add an anti foaming agent such as hydrophobic solids, or fatty acids. The colloidal stability of the ink is necessary to have quality printing, as well as to ensure a long shelf life of the ink. With out stabilizing colloidal system of the ink, the pigment would settle with in a short time making the ink useless. There are two methods by which water based inks can be stabilized, the addition of surfactants, and the addition of polymers, in some cases there the colloidal system is stabilized by both. The addition of surfactant and/or polymer to the water based ink will result in the surfactant and/or polymer adsorbing at the solid (pigment)/liquid interface. The adsorbed surfactant and/or polymer will form coating on the pigment of various compositions and thicknesses that will result in a net repulsion of the pigment with in the ink causing its stabilization. The draw back of using a surfactant and/or polymer to stabilize the colloidal system will be the negative affects seen on the applicability of the ink and its color strength.

The size and shape of the colorant particles are important in regards to the inks colorfastness, colloidal stability, viscosity, as well as many other properties. When pigments are used to color the ink it is necessary to choose the size and shape of the particles to meet the necessary requirements of the ink. The size of the particles of the pigment is important for colloidal stability, the smaller the particles are the easier it will be for the solution to stabilize, and also the smaller the particles are the brighter or more pronounced the color will be, typical size distributions of particles of carbon black The temperature and pH of water based inks must be monitored throughout the printing process, as even a small change in either can cause poor printing due to the change in the properties of the ink. A change in the pH or temperature of the ink will result in a change in the surface tension of the ink, the viscosity of the ink, as well as the colloidal stability of the ink, all of which are unwanted. The boiling point or heat of vaporization of the ink is an important factor in that it dictates the amount of time and the temperatures needed to dry or cure the ink. One of the difficulties of water-based inks is due to water having a high heat of vaporization. In order for the ink to dry or cure it is necessary for all of the solvent to be removed, and due to water having a higher heat of vaporization as compared to similar solvents that are used in inks, the time and the temperatures necessary to dry or cure the ink is increased greatly. Through the use of additives many of the properties of the ink can be changed. Typically water based inks are not water resistant or able to dry or cure quickly, this can be changed though by adding waxes to increase the inks water resistant property, or through the addition of a catalyst to accelerate the drying or curing. A problem with the addition of a catalyst to accelerate the drying or curing time is that the shelf life of the water-based ink is drastically reduced to around 12-24 hours.

Due to the major advances in water-based ink technology over the last forty years water-based inks can now be readily applied to most materials even plastics and foils, through the use of surface preparation techniques like the corona treatment. Through the development of new additives and printing processes water-based inks can now be used in the majority of printing process and on most materials and for many different applications. Water-based inks excel in printing applications involving paper, cardboard, and textiles, are even used to print on foils, plastics, and food packaging.

The water-based inks used in many ink-jet printers function in a similar way to other water-based inks in terms of the application of the ink to the substrate or surface. The ink is brought into contact with the surface, there is a delay in wetting and evaporation starts, wetting and penetration into the substrate or surface occurs while the solvent continues to evaporate until it is dry.

The manufacturing of water-based inks is a simple mixing process. The pigments, additives, and vehicle are each produced separately. When pigments are produced they are typically of a size that is too large to be used in inks. The pigments are ground or milled to particles sizes between 5 µm to 10 nm depending on what color strength, coating thickness, and dispersion properties are wanted. The pigment is then mixed in a high-speed mixer with the solvent or solvents, which in the case of water-based inks is going to be either mostly water or all water. The surfactant and/or polymer are added to mixer to stabilize the colloidal dispersion and allow for even distribution of the pigment. The additives are then added to the mixer to achieve the desired properties, which completes the ink making it ready for use.

Inks are made up of colorant, vehicle, solvent, and additives. There is what seems to be an infinite number of water-based inks. There are thousands of different pigments, additives, and vehicles that are used in different combinations and amounts to achieve the desired properties of the ink. For water-based printing inks, they typically will have a composition of 60% water/other solvents, 20% vehicle (resin), 15% colorant, and 5% additives.

Typical Component Paper Printing Ink Base

|  | % | % |
| --- | --- | --- |
| Organic pigment | 12 to 15 | 12 to 15 |
| Resin | 10 to 25 | 15 to 25 |
| Alcohol | 0 | 2 to 5 |
| Additives (waxes, antifoamers, dispersing and wetting agents, microbiocides) | 5 to 7 | 6 to 10 |
| Water | 53 to 73 | 45 to 65 |

Typical Composition of a Water-Based Ink Formula Used in Flexographic Printing on Paper.

| | |
| --- | --- |
| black #123 | 28.0 |
| Acrylic/alkali water varnish | 60.0 |
| Polyethylene wax | 4.0 |
| Isopropyl alcohol | 4.0 |
| Water | 3.9 |
| Silicone anti-foam | 0.1 |
| | 100.0 |

Over the last forty years significant developments have been made with water-based ink technology. All though research has slowed over the last several years advancements in water-based ink technology will continue for some time. Currently there is no viable alternative to water-based inks when environmental and health concerns are taken into account. In time the use of inks will decrease as more material that was printed in the past becomes electronic, such as with the trend of books being available.

Modern carbon black products are direct descendants of early "lamp blacks" first produced by the Chinese over 3,500 years ago. These early lamp blacks were not very pure and differed greatly in their chemical composition from current carbon blacks. Since the mid-1970s, most carbon black has been produced by the oil furnace process, which is most often referred to as furnace black.

Black ink for flexographic printing is typically manufactured by mixing and dispersing carbon black in a mixture of a printing ink concentrates and a varnish flexographic printed material is then obtained by printing this ink onto a substrate.

In order to ensure that this post print and preprint printing ink exhibits the required ink characteristics of gloss, coloring, etc., the black ink must be favorably dispersed within the mixture of the printing ink concentrates and the varnish. However, achieving a high degree of dispersion requires considerable time, and consumes significant quantities of time and labor in the ink manufacturing process.

Hot foils stamping is a step after corrugated board is printed with ink. On hot stamping foil, no picture is made on black post and preprint corrugated boxes. This is due to the fact that the foils will tarnish on the black boxes printed by post or preprint water-base black inks. Most of the time, the pictures on those black boxes are posted by way of off-set, silk screen, gravure or other prints.

Hot foil stamping will only tarnish on post prints and preprints black and it is not tarnished on other kind of printing, such as off-set printing, screen printing, gravure printing, etc. This is because post and pre print black inks are mainly made of carbon black.

Flexographic printing can be used to print on all sorts of materials, such as on toothpick wrappers to other big items like mattresses, etc. Flexographic printing is done on films, foils, tissues, enormous corrugated sheets, limp plastic firms, glass and textiles. These materials are chosen for their functionality. Flexographic printing is used to print on almost all material and no material cannot be printed by flexographic printing, and the growth of this process is faster than other conventional processes because of their versatility.

There are many methods and ways to run color-matching process. The process of matching ink color involves weighing and blending ink bases, making ink draw downs with a hand proofer.

The Post and preprint printing process has many variables that can act as moving targets if they are not in control when you initiate the flexo manufacturing process. The anilox is the heart of the flexo process so that is where we will start. The anilox roller determines ink color at press as well as in the ink lab that is where the color translation starts.

Color matching or proofing in the ink room or Ink Company's lab. The process starts by getting a color specification from the customer. E.g. 303 red, Coke red, HP Blue, no matter what the color is the ink technician has to formulate an ink system to match color to the substrate the printer is using. Color is controlled by the amount of ink film that is transferred to the substrate. In press we control that by using a variety of volumes with the anilox rollers or anilox sleeves that the printer is using. The ink room can use meyer rods, chrome anilox rollers and ceramic anilox rollers as the instrument for delivering the ink. The variables on the lab side are mostly related to instrument type and delivery of ink volume. Each instrument may delivery the ink differently and that will create a variation in ink film thickness resulting in color variation.

Tools for Colour Matching.
1. Handproofer, with determined anilox roll
2. Scale, precision to 0.01 gram
3. Mixing container, to contain 150 ml to 200 ml
4. Secular
5. Low speed stirrer
6. Substrates
7. Spectrophotometer (if LAB value required)

When blending, carefully record how much of each ingredient you add to create your first batch of eg. ABC Blue and 185 Red (Base colours). Record the quantities by weight, keeping track of each addition so that you can total each base weight once you're satisfied with the colors. Whether you work with ounces, pounds, grams, or kilograms is not important, as long as you are consistent with the weight units throughout your calculations.

Based on the weight of each of the base colors in the blends you make, you calculate the formulas of each color. These will be the initial formulas for these colors.

This is, perhaps, the most significant part of the process. As soon as you are satisfied with the blend, take samples of the ink and make drawdowns with a hand-held drawdown device (proofer). These will be the Drawdown Color Standards for these colors and they will become the standards you match to in the lab when blending subsequent batches of these formulas. They may differ in appearance from the press color standards, but they were created by the same inks that matched at press. This solves the problem of hand-proofers not mimicking press conditions, as now you will match a drawdown to a drawdown made with the same hand-held device.

The drawdown comparing color either by eye or color measuring instruments (spectrometer) at various steps in the process.

Each of the steps involved have their own set of procedures, and those procedures can vary from individual, as can the instruments used. However, the procedures can be adapted to any one. If the specifics of the procedures described here differ from yours, you should be able to adapt them to your particular situation.

SUMMARY OF THE INVENTION

A main object of the present invention is to provide a black ink composition, wherein a post and preprint black ink with lease or no carbon black with mixture of other colour inks concentrates like "blue plus orange" "blue plus yellow plus red" "green plus red" and with lease carbon black ink to achieve black jetness or densenesss. It is proven hot stamping on their formulations with least carbon black will not tarnish for period of at least 6 months.

An object of the present invention is to provide a black ink composition, obtainable by adding (colour concentrate mixture) solid red concentrate, blue concentrate, and green concentrate to a carbon black concentrate having a concentration of 10-25% by weight of the composition, wherein the carbon black concentrate has not undergone oxidation treatment, and the colour pigments are made up 70-90% by weight.

Another aspect of the black ink composition is to provide a black ink composition, wherein the quantity of the (colour concentrates mixture) red concentrate, blue concentrate, and the green concentrate is in the range of 10-25% by weights of the black ink.

Still a further object of the present invention is to provide a black ink composition, further comprising a resin which is water soluble.

Another aspect of the present invention provides a black ink composition, wherein hot stamping foils will not tarnish on non-carbon black pigment or less carbon black formulated with mixtures of other non-carbon colour ink concentrates.

Yet still another aspect of the present invention is to provide a black ink composition wherein least percentage of carbon black is added to a mixture of color ink concentrates to make the mixture looks blacker.

A further yet another aspect of the present invention is to provide a black ink composition in black ink formulation, wherein the percentage of carbon black concentrate added should not fall below 7 to the power of 10 measured by surface current resistance meter.

Yet another aspect of the present invention is to provide a black ink composition, wherein the LAB value measured by x-rite color spectro photometer is, L value of below 20, A value of 0+−1, B value of 0+−1 could be achieved.

An object of the present invention is to provide a flexographic printing ink, wherein the black ink is applicable in foils stamping on substrate which have been flexographically printed.

Another aspect of the present invention is to provide a black ink composition, wherein the ink formed from the black and colour inks complies to eco friendly or green environment standards.

In another aspect of the present invention, as materials to make inks are made from many different companies all over the world, and different materials and chemicals are used to formulations, to ensure that the materials used for the black in compositions for hot stamping it's appropriate to test all materials use for the black in composition in lab first. All components for the ink composition: varnishes, color concentrates, additives, eg. to be tested before using for the black ink composition. Additives used should be added to the varnish for the tests.

DETAILED DESCRIPTION OF EMBODIMENTS

The present invention provides a black ink composition, obtainable by adding solid (colour concentrates mixture) red concentrate, blue concentrate, and green concentrate to a carbon black ink having a concentration of 10-25% by weight of the composition, wherein the carbon black has not undergone oxidation treatment, and the composition comprises 75-90% by weight of the colour concentrate.

In the method of preparation, the quantity of the (colour concentrates mixture) red concentrate, blue concentrate, and the green concentrate is in the range of 10-25% by weights of the carbon black ink base. The carbon black is liquid at room temperature. The composition in accordance with the present invention further comprises a resin which is water soluble, and the black ink composition is an oil furnace carbon black.

| | |
|---|---|
| Acrylic/alkali water varnish | 20-60 |
| Orange | 20-30 |
| Blue | 10-25 |
| Carbon Black | 10-20 |
| Polyethylene wax | 2-5 |
| Isopropyl alcohol | 1-5 |
| Silicone anti-foam | 0.1-1.5 |

| | |
|---|---|
| Acrylic/alkali water varnish | 20-60 |
| Red | 10-15 |
| Yellow | 5-10 |
| Magenta | 5-10 |
| Blue | 10-20 |
| Carbon Black | 10-20 |
| Polyethylene wax | 2-5 |
| Isopropyl alcohol | 2-5 |
| Silicone anti-foam | 0.1-1.5 |

In another preferred embodiment, the black ink composition can be made into flexographic printing ink). In this method the carbon black pigment in the carbon black ink composition is solid at room temperature.

The carbon black used in printing inks has usually been subjected to oxidation treatment to improve the compatibility with resins that may be used in the flexographic printing, wherein flexographic printing can be carried out on all sorts of materials such as paper and paperboard, corrugated board, polyethylene, polyester film, polypropylene, polyvinyl chloride, polystyrene, cellophane, pressure sensitive coated firms, pressure sensitive substrates, glassine papers, metalized films and papers, kimdura synthetic papers, latex saturated papers, etc.

In accordance with the present invention, the black ink composition is best to be used in post print and preprint water-based black ink for hot stamping. The present invention has overcome the drawbacks of the metallic coloured hot stamping foils which will tarnish within 20 days on normal carbon black ink. In accordance with the present invention, in hot stamping process using the black ink composition, hot stamping foils will not tarnish on non carbon black ink or less carbon black ink formulated with mixtures of other non-carbon ink concentrates, for instance, "orange and blue", "blue and red and yellow", "Magenta, red, Yellow and Blue".

In order to provide the best black ink composition for hot stamping with no tarnish to metallic in hot stamping, a non-carbon black ink is used. In the present invention, least percentage of carbon black ink is added to the mixtures of colour ink concentrates (In the preferred embodiment, the percentage of carbon black ink that added to the mixtures should not falls below 7 to power of 10 measured by surface current resistance meter.

If OPV (Overprint Varnish) is used to enhance the black compositions, the black prints are covered with OPV for rub resistance or for other properties, eg. Gloss, matt, slip resistance, etc.

Generally, OPV will have bluish or reddish in tone measured by spectrometer, by taking advantage of the OPV reddish or blue tone, the black composition can be formulate to dark bluish or reddish gray/black on the printed, second layer of OPV added on the black prints can be enhanced bluish or reddish tone to make the final print black. This method of color match can be executed by colour spectrometer to get the LAB value.

The L.A. B value measured by x-rite colour spectro photometer, L value of below 20, A value of 0+−, B value of 0=−1 could be achieved. In the preferred embodiment, x-rite colour spectrometer is set at Dayling 65@10 degree (measuring from 0/45).

In accordance with the present invention, with regards to method for testing the use of black ink composition, hot stamp process is applied to hand cast samples of individual ingredients for the black ink composition and exposing it to lab humidity oven at temperature of 80 deg C. and humidity of 8- to 90% for 24 hours and observe any tarnishing on foil stamped. Samples should leave at room temperature exposed for a period not less than one month to observe any tarnishing on the foil stamped.

In accordance to the present invention, the formula for the black ink is in compliance to many eco friendly or green environment standards, eg, sony green partners, packaging restricted substance List PRSL, NPEO/OPEO, Heavy Metals compliances . . . etc, depending on the pigments, vehicles and additives use for the mixtures to formulate the black ink.

The carbon black ink compositions according to the present invention are also useful as inks other than flexographic printing inks, and in other coatings and the like.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A black ink composition for post print and preprint, comprising a colour concentrates mixture added in a carbon black ink to make a water-based ink composition, wherein the colour concentrates mixture includes a water soluble resin, water varnish of 20-60%, polyethylene wax of 2-5%, isopropyl alcohol of 2-5%, and silicon anti-foam of 0.1-1.5%, wherein a concentration of carbon black ink is 10-15% by weight of the black ink composition, and wherein the carbon black ink has not undergone oxidation treatment, and wherein an amount of the colour concentrates mixture is 75-90% by weight of the black ink composition, and a sum of the carbon black ink and the colour concentrates mixture being 100% by weight of the black ink composition.

2. The black ink composition for post print and preprint according to claim 1, wherein the colour concentrates mixture comprises solid red concentrate, blue concentrate, and green concentrate.

3. A flexographic printing ink, comprising a colour concentrates mixture added in a carbon black ink to make a water-based ink composition, wherein the colour concentrates mixture includes at least a water soluble resin, water varnish of 20-60%, polyethylene wax of 2-5%, isopropyl alcohol of 2-5%, and silicon anti-foam of 0.1-1.5%, wherein a concentration of the carbon black ink is 10-25% by weight of the water-based ink composition, wherein the carbon black ink has not undergone oxidation treatment, and wherein an amount of the colour concentrates mixture is 75-90% by weight of the water-based ink composition, and a sum of the carbon black ink and the colour concentrates mixture being 100% by weight of the water-based ink composition.

4. The flexographic printing ink according to claim 3, wherein the black ink is applicable in foils stamping on substrate which have been flexographically printed.

5. The flexographic printing ink according to claim 3, wherein the colour concentrate mixture comprises solid red concentrate, blue concentrate, and green concentrate.

6. A water-based black ink composition, comprising:
   a colour concentrates mixture, wherein the colour concentrates mixture is 75-90% by a weight of the water-based black ink composition; and
   a non-oxidized carbon black ink, wherein the non-oxidized carbon black ink is 10-15% by of the weight of the water-based black ink composition;
   wherein a sum of the non-oxidized carbon black ink and the colour concentrates mixture is 100% by weight of the water-based black ink composition.

7. The water-based black ink composition according to claim 6, wherein the colour concentrates mixture comprises a water soluble resin, water varnish of 20-60%, polyethylene wax of 2-5%, isopropyl alcohol of 2-5%, and silicon antifoam of 0.1-1.5%.

* * * * *